No. 746,941. PATENTED DEC. 15, 1903.
J. FACER & T. G. STEVENS.
VEHICLE SPRING.
APPLICATION FILED SEPT. 16, 1902.
NO MODEL. 2 SHEETS—SHEET 1.

WITNESSES. INVENTORS.
Albert Jones Thomas George Stevens
Samuel Percival James Facer
By their Attorneys.
Wheatley & MacKenzie No. 746,941. PATENTED DEC. 15, 1903.
J. FACER & T. G. STEVENS.
VEHICLE SPRING.
APPLICATION FILED SEPT. 16, 1902.
NO MODEL. 2 SHEETS—SHEET 2.

WITNESSES.
Albert Jones
Samuel Percival

INVENTORS.
Thomas George Stevens
James Facer
By their Attorneys.
Wheatley MacKenzie No. 746,941. Patented December 15, 1903.

UNITED STATES PATENT OFFICE.

JAMES FACER AND THOMAS GEORGE STEVENS, OF BEDFORD, ENGLAND; SAID FACER ASSIGNOR TO SAID STEVENS.

VEHICLE-SPRING.

SPECIFICATION forming part of Letters Patent No. 746,941, dated December 15, 1903.

Application filed September 16, 1902. Serial No. 123,624. (No model.)

*To all whom it may concern:*

Be it known that we, JAMES FACER and THOMAS GEORGE STEVENS, subjects of the King of Great Britain and Ireland, residing at Pavenham, Bedford, England, have invented certain new and useful Improvements in or Connected with Springs of Vehicles; and we do hereby declare the following to be a full, clear, and exact description of the invention, such as will enable others skilled in the art to which it appertains to make and use the same.

This invention for improved mechanism for producing unison of action in the springs of vehicles has for its object to so control the movements of the vehicle-body on its springs that in whatever manner the load may be distributed the whole of the springs of the vehicle shall act in unison in the support of such load; and it consists, essentially, in connecting the body of the vehicle with its supporting-axle or axle-bearing by rocking levers fixed on or formed integral with a common connecting-shaft working in a suitable bearing or bearings secured or connected to the body of the vehicle and so arranged that on a load being imposed on one of, say, two opposite springs its deflection causes the rocking levers to rotate and both springs to be deflected in unison. By these means pitching and rocking of vehicles are greatly diminished and very much lighter, and consequently more sensitive, springs can be employed than is possible with vehicles provided with springs acting independently of each other.

Figure 1:
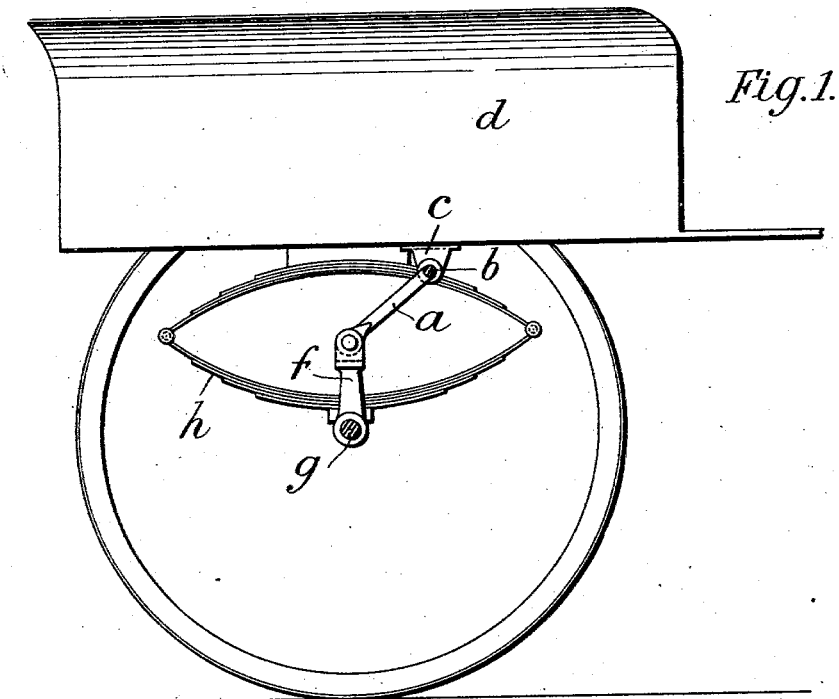
Figure 2:
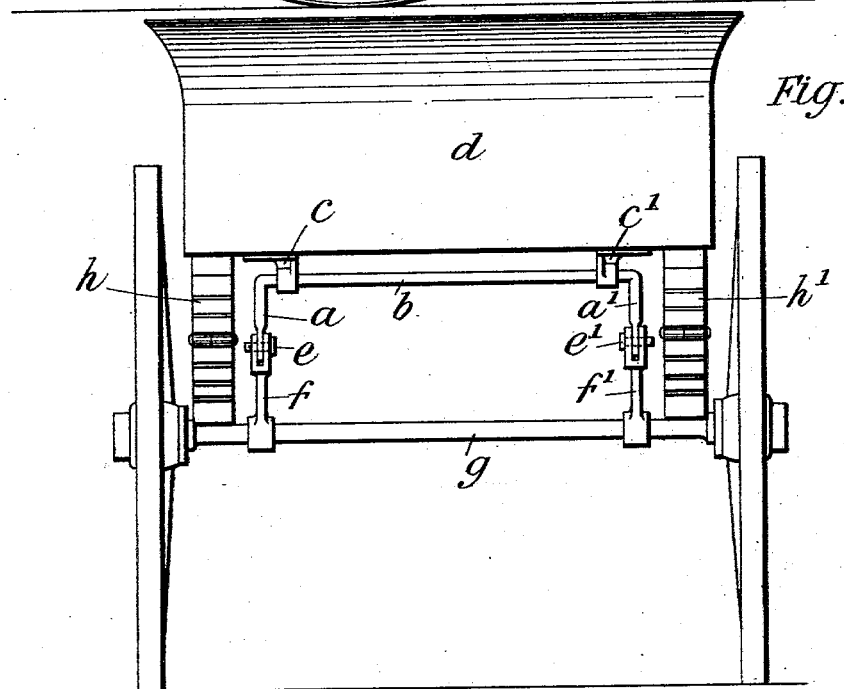
Figure 3:
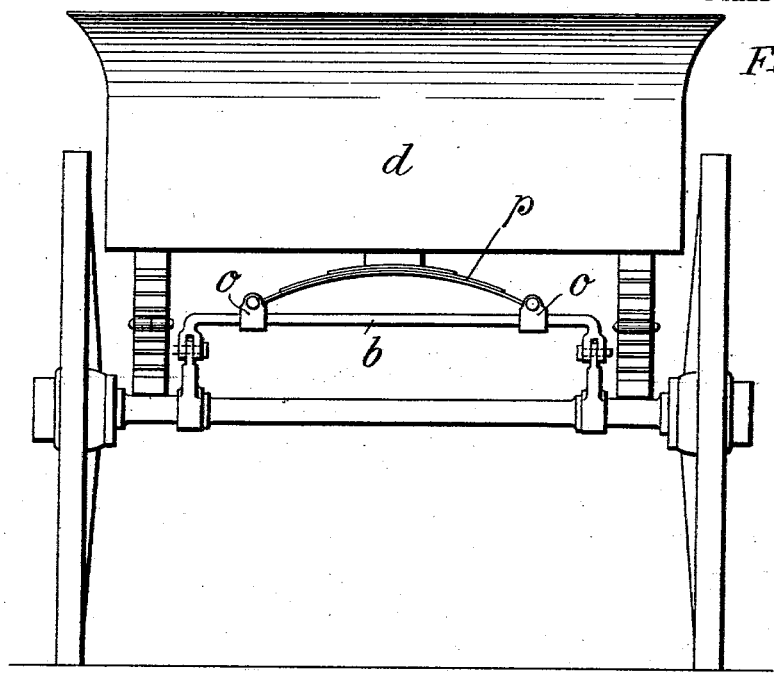
Figure 4:
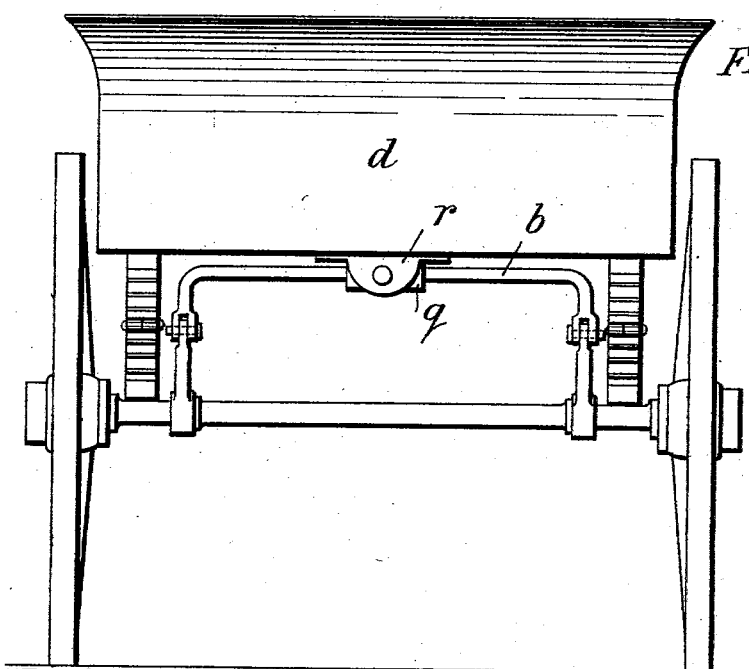

In the accompanying drawings, Figure 1 is a side elevation of one arrangement of springs and connections constructed according to this invention, and Fig. 2 is a rear end elevation of the same. Figs. 3 and 4 are rear end elevations of modified arrangements or designs.

Referring to Figs. 1 and 2 of the drawings, two rocking levers $a$ $a'$ of equal length are rigidly secured to or integral with the connecting-shaft $b$, working in bearings $c$ $c$, secured to the body $d$ of the vehicle, and are also pivotally connected by pins $e$ $e'$ to two equal spring-links $f$ $f'$, themselves connected to lugs mounted on the axle $g$, as shown. Springs $h$ $h'$ are secured to the body $d$ and axle $g$ in the usual manner. The object of the employment of the spring-links $f$ $f'$ is to reduce the communication of shocks to the levers $a$ $a'$ when passing over rough ground.

Assuming the shaft $b$ and axle $g$ to be parallel to each other, their axes will always remain parallel at whichever end of the axle the force is exerted. Consequently when one spring is deflected the other is simultaneously deflected to an equal amount, and therefore assuming the springs to be of equal elasticity each will support a half of the load.

In the arrangement shown in Fig. 3 the bearing-blocks $o$ of the rocking shaft $b$ are pivoted to a cross-spring $p$, secured to the body $d$ of the vehicle, as shown.

Fig. 4 shows the rocking shaft $b$, carried by a single bearing-block $p$, pivoted to a base-block $r$, fixed to the center of the bottom of the body $d$ of the vehicle.

What we claim, and desire to secure by Letters Patent, is—

1. A means for producing unison of action in the springs of two-wheeled vehicles comprising a cross-spring secured to the bottom of the body of the vehicle and carrying bearing-blocks at its extremities, coupled rocking levers of equal length connected together by a shaft working in the said bearing-blocks, links having one end pivotally connected to the ends of the said levers and the other end to the axle, and springs secured to the axle and the body of the vehicle substantially as described.

2. A means for producing unison of action in the springs of two-wheeled vehicles comprising a pivoted bearing-block secured to the body of the vehicle, coupled rocking levers of equal length connected together by a shaft working in the said bearing-block, links having one end pivotally connected to the ends of the said levers and the other end to the axle, and springs secured to the axle and the body of the vehicle, substantially as described.

In testimony whereof we have affixed our signatures in presence of two witnesses.

JAMES FACER.
THOMAS GEORGE STEVENS.

Witnesses:
ALBERT JONES,
W. J. SKERTEN.